US007293661B2

(12) United States Patent
Saaski et al.

(10) Patent No.: US 7,293,661 B2
(45) Date of Patent: *Nov. 13, 2007

(54) FILTRATION MEDIA COMPRISING GRANULES OF BINDER-AGGLOMERATED ACTIVE COMPONENT

(75) Inventors: Bruce D. Saaski, Caldwell, ID (US); Roger P. Reid, Caldwell, ID (US)

(73) Assignee: Omnipure Filter Company, Caldwell, ID (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/396,296

(22) Filed: Mar. 24, 2003

(65) Prior Publication Data

US 2003/0224932 A1   Dec. 4, 2003

Related U.S. Application Data

(60) Provisional application No. 60/367,028, filed on Mar. 23, 2002.

(51) Int. Cl.
*B01D 39/00* (2006.01)
*B32B 1/00* (2006.01)
*B32B 5/16* (2006.01)
*B32B 27/00* (2006.01)

(52) U.S. Cl. .............. 210/504; 210/483; 210/488; 210/490; 210/500.1; 210/502.1; 210/503; 210/506; 55/514; 55/524; 428/403; 428/407; 502/416

(58) Field of Classification Search .............. 210/483, 210/488, 490, 500.1, 500.25, 500.26, 502.1, 210/503, 504, 506; 96/134, 135; 55/514, 55/524; 428/403, 407; 502/416
See application file for complete search history.

(56) References Cited

U.S. PATENT DOCUMENTS 3,721,072 A * 3/1973 Clapham .................. 96/153
4,041,961 A   8/1977 Shaler et al. .............. 132/40
4,102,816 A   7/1978 Stalling ................... 252/228
4,147,624 A   4/1979 Modell ..................... 210/32
4,299,613 A  11/1981 Cardarelli ................ 71/64 F
4,753,728 A   6/1988 VanderBilt et al.
4,859,386 A   8/1989 VanderBilt et al.
4,965,320 A  10/1990 Overbergh ............... 525/207
5,017,318 A   5/1991 Vanderbilt et al.
5,019,311 A   5/1991 Koslow .................... 264/122
5,133,871 A   7/1992 Levy ........................ 210/688

(Continued)

FOREIGN PATENT DOCUMENTS

GB   2013102   8/1979   ............ 39/16

Primary Examiner—John Kim
(74) Attorney, Agent, or Firm—Pedersen & Co., PLLC; Ken J. Pedersen; Barbara S. Pedersen

(57) ABSTRACT

Granules comprise binder-agglomerated active particles for liquid treatment or filtration. Each granule has a center core of a material that itself has binding properties without the addition of other binders or sprays or adhesives, or, alternatively, each granule comprises a matrix of active materials stuck together with the binder. The binder structure preferably ranges from a non-uniform matrix of binder formed by heat-deformed binder particles, to a clump of binder particles generally retaining the original shape or the binder particles, to non-continuous connectors of binder between active particles. The invented two-part media has high surface area per volume of media, which, because the outer surface and inner void surfaces of the particles are preferably substantially covered with active particles, translates to high activity for the preferred treatment process. Therefore, while a mixture of active particles may be used and a mixture of binders may be use, each media granule preferably consists only of a matrix, clump, or plurality of connectors of binder coated with active particles, with preferably no support for the active component other than the binder material.

9 Claims, 5 Drawing Sheets

U.S. PATENT DOCUMENTS

| | | | |
|---|---|---|---|
| 5,137,975 A | 8/1992 | Kelusky | 525/263 |
| 5,147,722 A * | 9/1992 | Koslow | 428/402 |
| 5,268,197 A | 12/1993 | Pons et al. | 427/221 |
| 5,277,931 A | 1/1994 | Maglio et al. | 427/212 |
| 5,332,426 A * | 7/1994 | Tang et al. | 96/153 |
| 5,582,892 A | 12/1996 | Anderson | 428/64.1 |
| 5,603,987 A | 2/1997 | Lisenko | 427/221 |
| 5,639,550 A * | 6/1997 | Lisenko | 428/404 |
| 5,639,822 A | 6/1997 | Hungenberg et al. | 525/53 |
| 5,656,069 A | 8/1997 | Nikolskaja et al. | 96/4 |
| 5,685,986 A | 11/1997 | Yamada et al. | 210/496 |
| 5,767,060 A | 6/1998 | Hanrahan | 210/502.1 |
| 5,776,353 A | 7/1998 | Palm et al. | 210/777 |
| 6,127,512 A | 10/2000 | Asrar et al. | 528/272 |
| 6,200,677 B1 | 3/2001 | Richardson et al. | 428/343 |
| 6,231,758 B1 * | 5/2001 | Morris et al. | 210/163 |
| 6,258,876 B1 | 7/2001 | Medoff et al. | 524/13 |
| 6,270,609 B1 | 8/2001 | Markell et al. | 156/218 |
| RE37,597 E | 3/2002 | Rajagopalan et al. | 473/385 |
| 6,476,137 B1 | 11/2002 | Longo | 525/191 |
| 6,764,601 B1 | 7/2004 | Levy et al. | 210/660 |
| 6,793,866 B2 * | 9/2004 | Kelly et al. | 264/413 |
| 2001/0042719 A1 | 11/2001 | Levy | 210/660 |
| 2002/0053119 A1 | 5/2002 | Provost et al. | 24/452 |
| 2003/0032702 A1 | 2/2003 | Medoff et al. | 524/13 |

\* cited by examiner

FILTRATION MEDIA COMPRISING GRANULES OF BINDER-AGGLOMERATED ACTIVE COMPONENT

This application claims priority of provisional application Ser. No. 60/367,028, filed Mar. 23, 2002, the disclosure of which is incorporated herein by this reference.

BACKGROUND OF THE INVENTION

1. Field of the Invention

The invention relates to a high-surface-area, high-activity granular media for liquid filtration and/or treatment. More specifically, the preferred embodiment relates to a two-part media composition of binder and active particles, without a conventional solid support core. The media comprises binder-agglomerated active materials, wherein a binder material holds together particles of active component so that a high percentage of the active particles are exposed to the liquid being filtered/treated. The granules may take the form, for example, of an inner core and/or matrix of binder that supports an active component coating, or the form of active particles bound together by particles, globules, or amorphous shapes of binder.

2. Related Art

Particulate materials have been disclosed for removal of heavy metal contaminants from aqueous solutions and vapor phase systems, for example, in Lisenko (U.S. Pat. Nos. 5,639,550 ("'550") and 5,603,987 ("'987")).

Lisenko '550 illustrates in FIG. 1A a prior art media, such as found in U.S. Pat. No. 5,277,931, in which a porous particle (S) is first sprayed with an aqueous basic material (B) and subsequently sprayed with a concentrated aqueous acidic solution of a source of suitable metallic ions. The sprayed-on source of suitable metallic ions is the primary material (P), that is, the active material. Such spray-on prior art media are described by Lisenko as exhibiting high attrition.

Lisenko discloses a particulate media comprising three-part granules (G', FIG. 1B), wherein each granule is made of a large support material (S), and a primary material (P) bound to the outer surface of the support material by a binder material (B). In Lisenko, the softening temperature of the binder is less than the softening temperature of the support material and less than the softening temperature of the primary material. Thus, Lisenko discloses a three-part composite, wherein the center core is a solid particulate that holds two layers on its outer surface, an intermediate layer of binder and an outer layer of primary filtration material. In other words, the three-part media is a solid support with a solid primary material "stuck" to the support by a layer of binder that is relatively very thin compared to the diameter of the support material.

In three-part granules, the support material preferably has preferably substantially uniform particle diameters which are substantially greater in size than the particle diameters of the primary material. The support material may be granulated activated carbon, glass beads or bubbles; porous or non-porous volcanic media; plastic beads or pellets; plastic fibers; wood fibers; carbon fibers; ceramic media; fired or unfired clay; diatomaceous earth; metal particles; ferro magnetic material; silica gel; magnetic stainless steel; organic fiber; cellulose fiber; acrylic fiber; and silicon carbide.

The primary material for the three-part granules may be inorganic hydrated metal oxides, amorphous metal silicates, zeolite and mixtures thereof, and more preferably inorganic hydrated titanium oxides or silicates, inorganic hydrated tin oxides or silicates and mixtures thereof, and most preferably titanium silicate, tin silicate and mixtures thereof, and most preferably titanium silicate, tin silicate and mixtures thereof. The primary material is chosen for a desired property for treatment, such as ion exchange capacity or metals removal. Preferably, the primary material may be micronized or powdered in form.

The binder in a three-part granular media is chosen from a wide variety of materials including crystalline thermoplastic polymer, thermoplastic polymer, crystalline polymer and mixtures thereof, preferably polyolefins, polyamides and mixtures thereof, and specifically polyethylene, polypropylene, ethylene vinyl acetate and mixtures thereof. The binder material may be provided in particulate form to the process of manufacturing the composite media.

Typical relative sizes for the components of three-part granular are illustrated in FIG. 5A. The large support particles are shown in the 4-100 mesh range (from very large particles down to 140 microns), the primary particles are shown in the 230-500 mesh range (approximately 60 down to 25 microns) and binder particles are shown in the 450-500 mesh range (approximately 30 microns and smaller).

During manufacture of the three-part granular media, the primary particulate, binder particulate, and support particulate are mixed and the mixture is heated to a temperature within about 25 degrees of the softening temperature of the binder material. This way, the binder material does not soften to the point where it readily flows and masks the internal pores of the primary and support materials. This procedure causes the binder material to lose shape and become sufficiently viscous to adhere the primary particles to the support material, with the binder in-between. Then, the mixture is cooled to ambient whereby adhesion of the binder material between the primary material and the support material becomes substantially permanent. The result is a particulate media with particles having diameters generally equal to the diameter of the support material plus the layers of binder and primary material.

Still, there is needed an improved particulate filter/treatment media that is strong, very high in active surface area, and economical and convenient to make and use. The present invention serves these needs.

SUMMARY OF THE INVENTION

The invented media comprise binder and active materials agglomerated together to form media granules. The agglomerated materials preferably comprise only two components, namely, the binder plus primary active material adhering to, or connected by, the binder. These agglomerated materials may comprise a core/support of polymeric binder holding active materials on the binder surface and/or active materials stuck together by relatively small and discontinuous amounts of binder. The invented granules have a large surface area of active material exposed to the liquid being filter/treated, because of the two-component structure and because of the presence of many void spaces in each granule that provide access to active sites in the interior of the granule. The invented granules of agglomerated materials preferably do not include a large solid support coated by an intermediate layer of binder and an outer layer of active material.

Whether a granule takes the form of a coated matrix of binder, coated cores of binder stuck together, or active particles stuck together by relatively small and discontinuous amounts of binder, each granule has many interior void spaces or channels and a large surface area of exposed active component. The exposed active material comprises both the active material on the outer surface of the granule and the active material on the interior surfaces of the granule that surround and define the void spaces. Because preferably none of the granule mass or volume is a conventional solid support core, a greater percent of the mass and volume of each granule is active component. Because there are many voids extending into and even all the way through the granule, the active component is easily accessible to the liquid being filtered. These features result in the granule exhibiting higher activity than conventional three-part media granules while still exhibiting good pressure drop characteristics and good flowrates even under gravity flow conditions.

DETAILED DESCRIPTION OF PREFERRED EMBODIMENTS OF THE INVENTION

Figure 1:
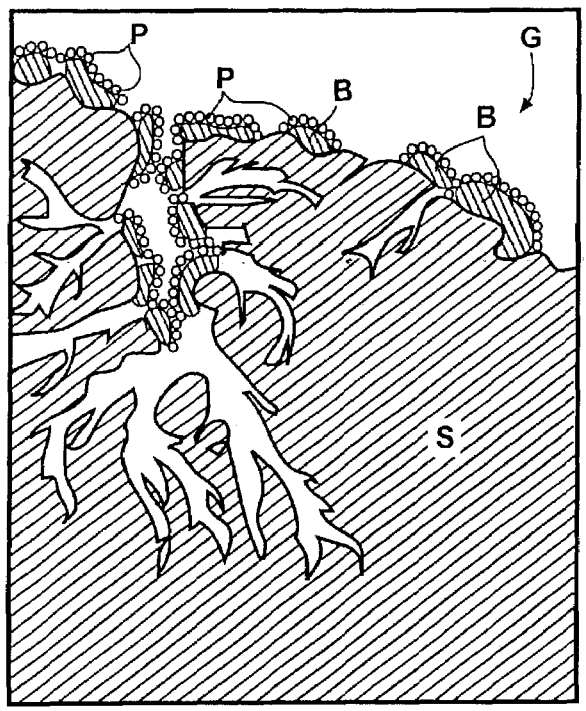
FIGS. 1A and 1B are prior art filtration media, including a solid support, a binder material, and a primary material.
Figure 1:
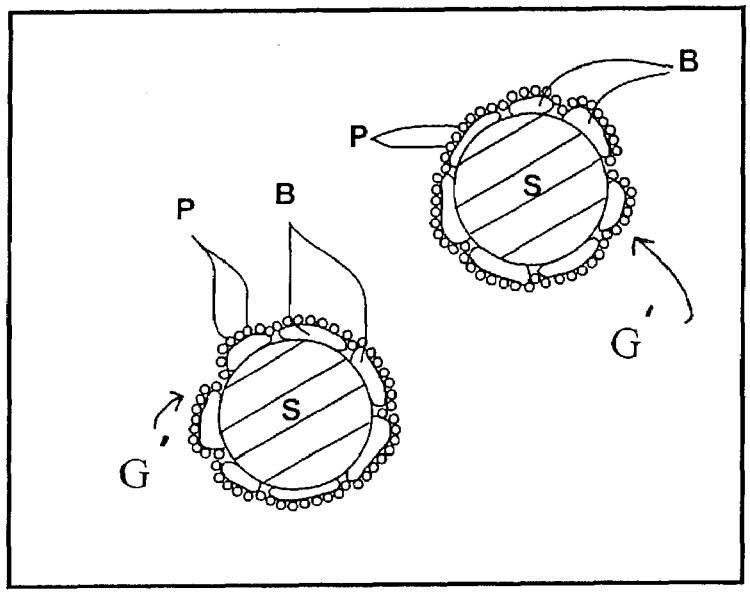

Referring to the Figures, there are shown prior art three-part filtration media granules, and some, but not all, of the embodiments of the invented binder-agglomerated granular media. While the preferred media according to the invention may be hereafter and in the claims referred to as a "treatment media," this term includes media for many purposes, including filtration, additive addition, adsorption, metals removal, and other treatments of fluid streams, including preferably both liquid and gases.

The preferred media granule is made from two components, which are a binder that becomes a core/support or a connecting means, and a material that is active to accomplish the filtration and/or treatment of the fluid. Because the core/support/connecting means is a binder material, no further component besides these two is necessary, that is, no solid support particle is needed. The preferred structures of the invented granules are 1) a nonuniformly-shaped support matrix of binder, to which the particulate active material adheres, and which has many interior void spaces or channels; 2) a plurality of cores of binder (retaining generally the original shape of the binder particles) coated with particulate active material, wherein the plurality of coated cores adhere together to form a single granule due to additional binder connecting the cores together or because portions of the binder cores are exposed and stick together; 3) a plurality of active particles stuck together by a relatively smaller amount of binder in discontinuous portions; and 4) structures that are somewhere between or a combination of these structures. In a much-less preferred embodiment, each granule comprises a single, generally spherical core of binder material coated with particulate active material.

The binder has a melt index in a range that allows it during manufacture of the media to 1) deform sufficiently so that a plurality of binder particles adhere together to form clumps/groupings of particles or a matrix of binder and/or 2) become sufficiently tacky for active material to adhere to it. Cooling of the granules at or near the end of the manufacturing steps serves to solidify/firm-up the binder in the "clumped," "matrix," or "connecting" shapes, each having internal voids and channels.

Whether the "clumped," "matrix," and "connecting" binder shapes are achieved in the granules depend chiefly on the relative amounts of binder and active particles, and on the softening point/melt index of the binder, the temperature of the manufacturing process, and the sizes and type of binder and active materials. With higher melt index and/or more mixing time or higher temperature during the heating step, and optionally with compression, the binder particles tend to become a "matrix," which takes the form of a plurality of binder particles sticking together and substantially losing their original shape to deform or "smear" into a network of irregularly-shaped portions with internal voids. With lower melt index and/or less mixing time or lower temperature during the heating step, and with low or preferably no compression, the binder particles tend to stick together but generally retain their original shape. With lower amounts of binder relative to active particles, binder particles tend to stick in between and serve as connectors between several active particles, rather than to stick to multiple other binder particles to form a binder clump or matrix.

The two components of the granules may be selected from lists of conventional binders and primary active materials. The binder is preferably a polymeric binder that is inactive or inert to the fluid, preferably performing no treatment or chemical action on the fluid being treated, and preferably no physical action upon the fluid being treated. The coating material is preferably an active material chosen for a specific purpose or purposes of treatment. Examples of active coating materials include metal sorbent or carbon. Also, metal shavings or particles may be effective active material.

Referring specifically the Figures:

FIG. 1B, prior three-component granules G' are designed to have, relative to each other, a large support particle (S), a outer layer of medium size primary particles (P), and small binder particles (B) melted together into a middle layer. When these three particle sizes are mixed and heated, the desired prior art product is produced, that is, a large solid core with active primary ingredient stuck to it's outer surface by the binder.

Figure 2:
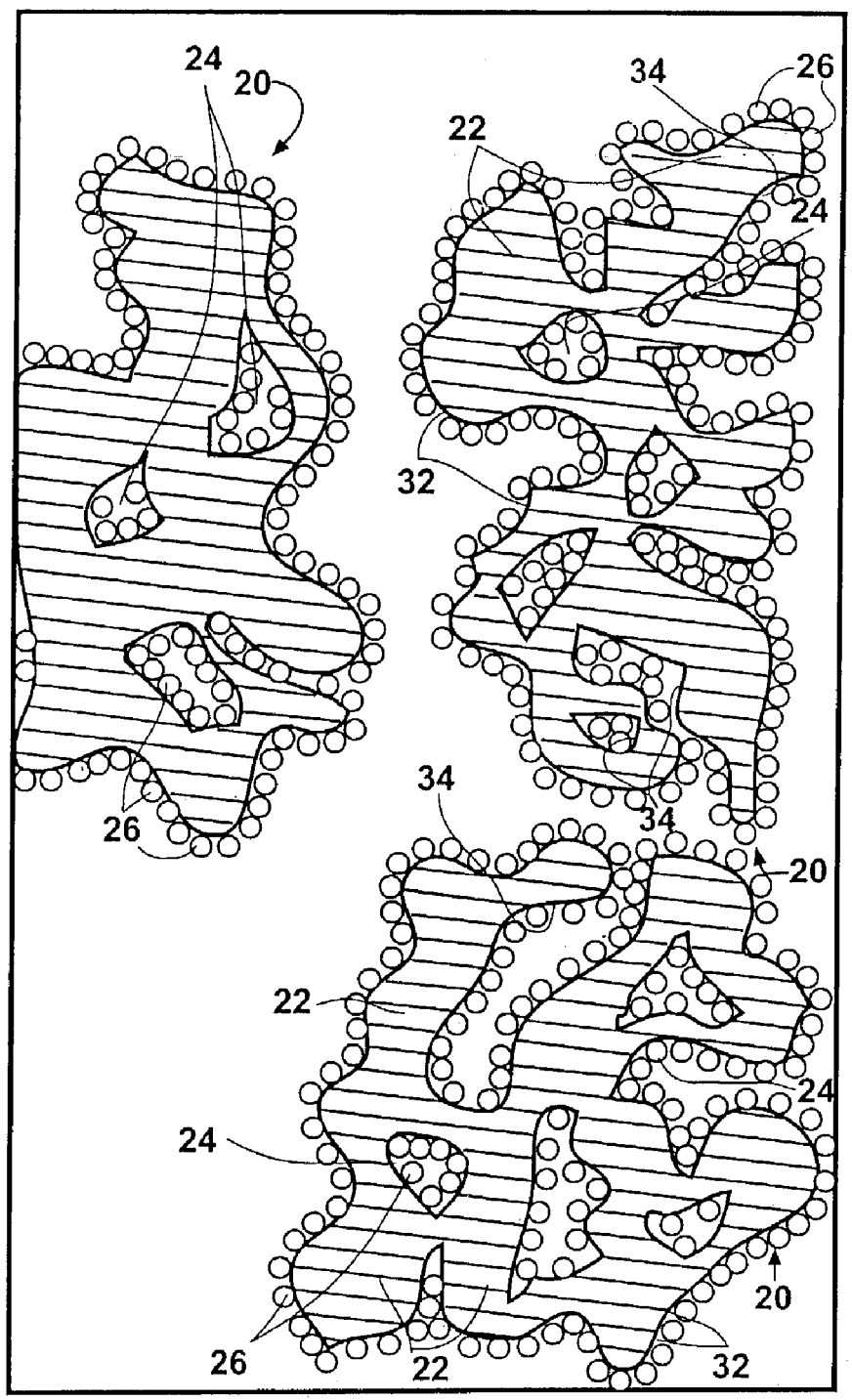
FIG. 2 is a depiction of one embodiment of a media according to the invention with a binder matrix coated with active primary material.
Figure 3A:
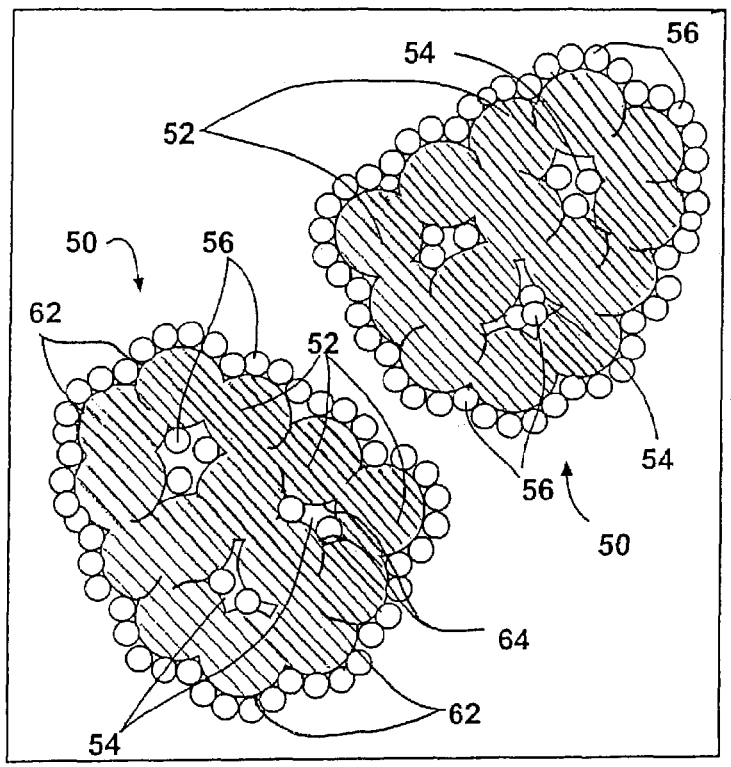
FIG. 3A is a depiction of another embodiment of the invented granular media with a plurality of generally spherical binder cores each coated with active primary material, and the binder cores adhering to each other or connected by additional binder.
Figure 3B:
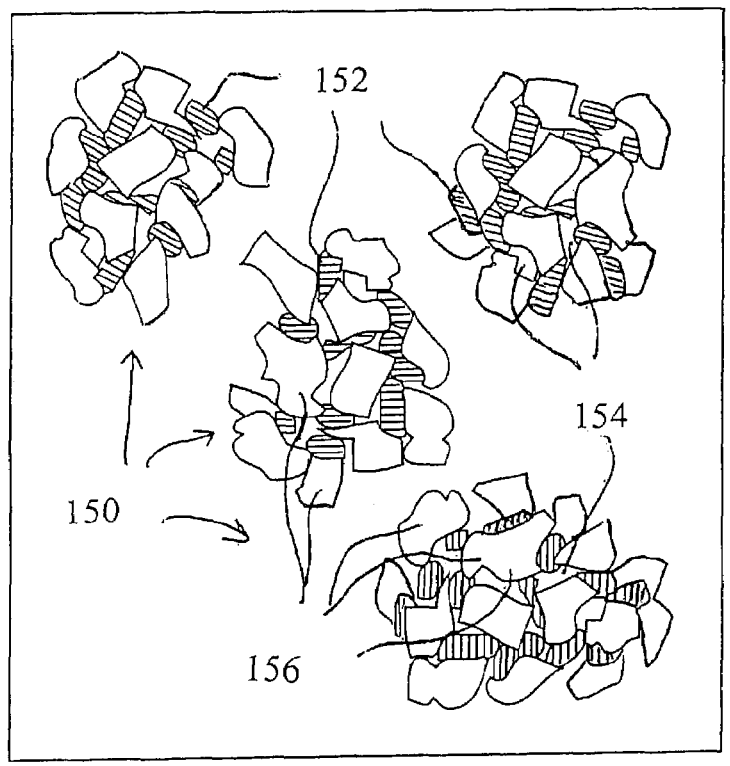
FIG. 3B is a depiction of another embodiment of the invented granular media comprising active primary material connected by small, discontinuous connectors of binder.
Figure 4:
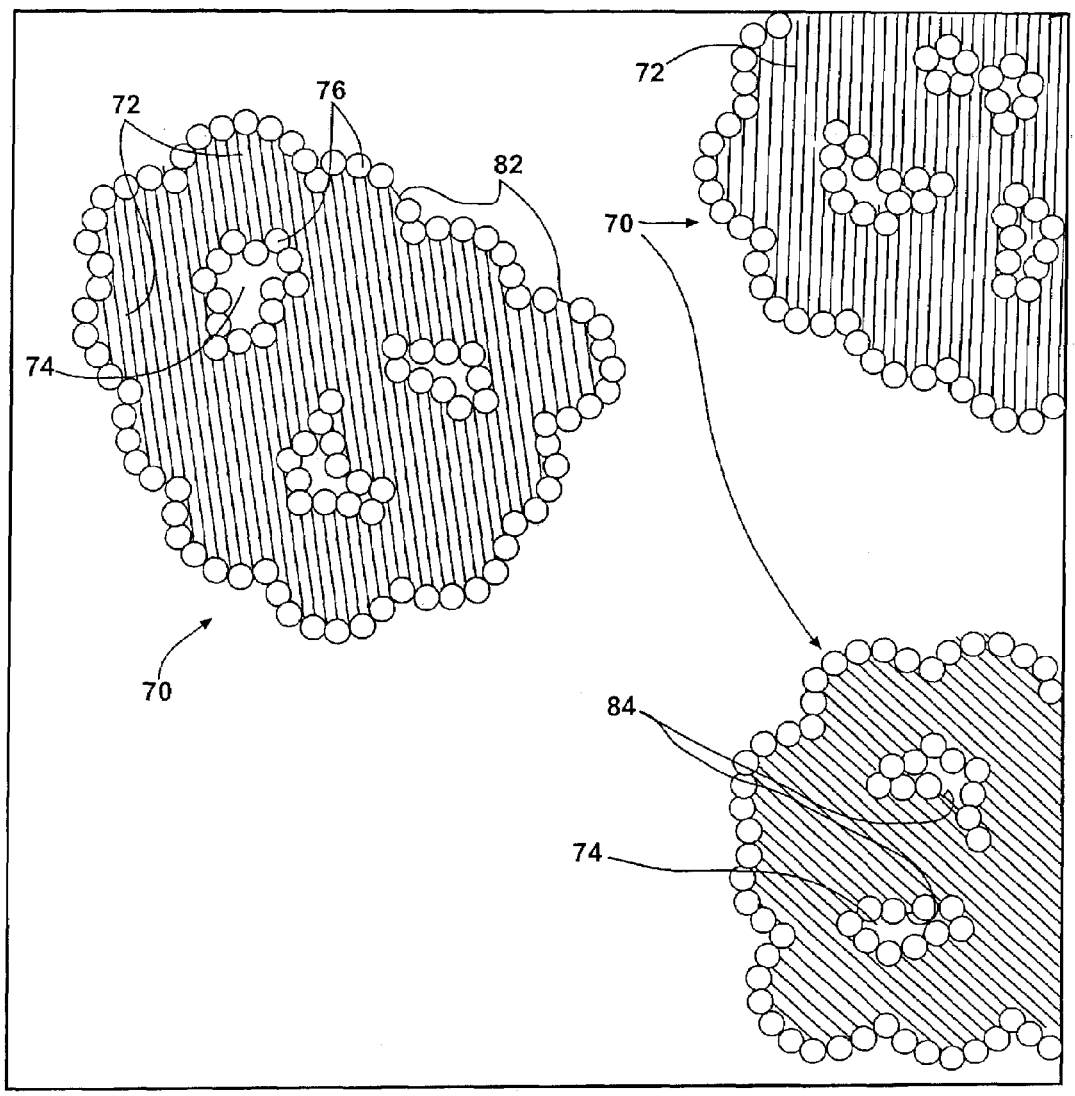
FIG. 4 is a depiction of another embodiment of the invented media, which has been compressed and then re-separated into granules.

Referring to FIGS. 2-4, the preferred methods and compositions of the invention result in a very high active surface area per volume of media, with good pressure drop characteristics. This high surface results from small binder particles and small active (or "primary") materials coated onto the binder material, rather than relying on primary material being coated onto binder along the surface of a large, solid core. The invented media attains this high surface area with acceptable-to-excellent pressure drop, because the large, solid core of each prior art granule is replaced with a clump or matrix of binder, having many internal voids and channels that allow liquid flow into and through the granule, or with small, discontinuous amounts of binder connecting portions of active particles.

Referring specifically to FIG. 2, there are shown cross-sectional views of media granules 20 according to one embodiment of the invention, wherein the center core of granules 20 comprises a binder matrix 22, that is, a nonuniform structure of binder (cross-hatched in FIG. 2) having multiple voids and channels 24. The embodiment of FIG. 2 is formed according to an embodiment with higher melt index (for example, 10 g/min) and a temperature selected to deform the binder without encapsulating the active particles. Primary active particles 26 adhere to the binder matrix 22, coating part or all of the outer surface 32 of the matrix and part or all of the inner surfaces 34 of the matrix, that is, the surfaces surrounding and defining the voids and channels 24. As one may see from FIG. 2, the binder matrix 22 does not take the form of a uniform shape or spheres, but rather a network of irregular shapes with internal voids. The binder particles in the granules 20 of FIG. 2 have softened and deformed enough to connect together and substantially lose their original shape.

In FIG. 3A, the media granules 50 according to the invention have a center core of binder particles that have softened and deformed less and, although they stick together, they retain more of their generally original shape. The binder particles, therefore, form a core that is a "clump" or "cluster" or "grouping" 52 of binder (cross-hatched in FIG. 3A), with internal voids and channels 54. Primary, active particles 56 adhere to part or all of the outer surface 62 of the clump 52, as well as part or all of the inner surface 64 surrounding and defining voids and channels 54. This clumping or grouping effect (as opposed to the matrix) is believed to be a result from one, or a combination of several, of the factors of: a lower temperature, lower agitation or stirring time, lack of compression, very low met index, and/or relatively high ratios of binder to active materials.

FIG. 3B illustrates media granules 150 wherein the binder particles or globules 152 (shown in cross-hatching) act to connect the active particles 156 together by sticking between the active particles but not sticking to many other binder particles or globules. In such embodiments, globules of binder are dispersed between the active particles, but tend not to form a continuous matrix or continuous clumping of binder. Like the matrix or clumping binder structures, this "connector" binder structure also results in large numbers of voids and channels 154 through each granule for increased surface area and good pressure drop. Such embodiments may be made, for example, by combining relatively small amounts of binder with the active particles, as in Example I and II below.

FIG. 3B illustrates granules that are made from relatively large, irregularly-shaped activated carbon particles (156) agglomerated together by smaller particles/globules of binder (152). In such embodiments wherein relatively small, discontinuous portions of binder connect relatively large particles of active material, there are many voids in each granule, as well as channels that extend all the way through the granule.

The preferred embodiments of the invention involve no compression of the mixture of binder and active particles. However, some less-preferred embodiments may include a limited amount of compression, as illustrated in FIG. 4. Already-formed granules are treated in a compression step, for example, in the 1-30 psi range, while the granules are still above the binder's softening point, followed by separating and sizing the granules to the desired granule size.

One may see, in FIG. 4, that the active particles 76 are more uniformly adhering to the binder core 72 (cross-hatches), and more deeply embedded in the binder material both at the outer surface 82 of the granule and at the inner surface 84 of the voids and channels 74. There are still many internal voids and channels 74 in the granules 70 that, as in the other granules 20, 50, are accessible to liquid being filtered.

Many different sizes, types, and combinations of binders and active materials may be used in the binder-agglomerated granules of the invention. Active materials may be in the size range of 850 microns (about 20 mesh) down to one (1) micron, for example, with a preferred size range of 300 microns (about 50 mesh) down to one (1) micron. Some embodiments are very effective with smaller active materials of only 150 microns and smaller. Preferred active particles may be activated carbon, for example, 50×20 mesh carbon; lead sorbents; synthetic and natural zeolites; alumina oxides; titanium hydroxides; hydrated metal oxides; resins; charged polymers with higher softening point than binder; and mixtures of the same. Other active particles for various water treatment processes may be used, as will be known to those of skill in the art after understanding this Description and Drawings. For example, the primary material may be inorganic hydrated metal oxides, amorphous metal silicates, inorganic hydrated titanium oxides or silicates, inorganic hydrated tin oxides or silicates and mixtures thereof, titanium silicate, tin silicate and mixtures thereof, titanium silicate, tin silicate and mixtures thereof. Primary material may be micronized or powdered in form, for example.

The binder according to the invention may be, for example, thermoplastic polymer, thermoplastic polymer, crystalline polymer and mixtures thereof, preferably polyolefins, polyamides and mixtures thereof. For example, polyethylene, polypropylene, ethylene vinyl acetate and mixtures thereof are especially useful. The binder material may be provided in particulate/powdered form, for example. Binders according to the invention most preferably have Vicat Softening Points in the range of 150-400 degrees F., whereas the active materials included in the granules according to the invention have softening points greater than 400 degrees F., and typically, much greater than 400 degrees F.

The binder particles may be provided in a wide range of diameters, for example, 10-10,000 microns, with the preferred binder particles have diameters in the range of about 1-150 microns and more preferably in the range of about 75-150 microns or about 100×200 standard U.S. mesh size.

During the heating step used to binder-agglomerate the active particles, the binder particles preferably do not flow, but do soften and/or deform from their original shape to an extent that forms the preferred binder matrix, the connection of a plurality of binder cores together to form a granule, and/or the connection of active particles with discontinuous portions of binder. Preferred binder particles exhibit a melt index in the range of $\leq 10$ g/min. Binder particles with a melt index in the range of 1-10 g/min may be appropriate for forming a binder matrix as in FIG. 2. Binder particles with a very low melt index in the range $\leq 1$ g/min. are more likely to form binder structures shown as in the FIG. 3 and FIG. 4 embodiments. Binders with what is called a "zero" or very low melt index binder, that is, preferably less than or equal to 1 g/10 minute, as measured by conventional standard melt index tests, are expected to exhibit ultra high activity but slightly higher fines content. (Melt Index is measured by ASTM D1238 or DIN 53735 at 190 degrees C. and 15 kilograms.)

Figure 5A:
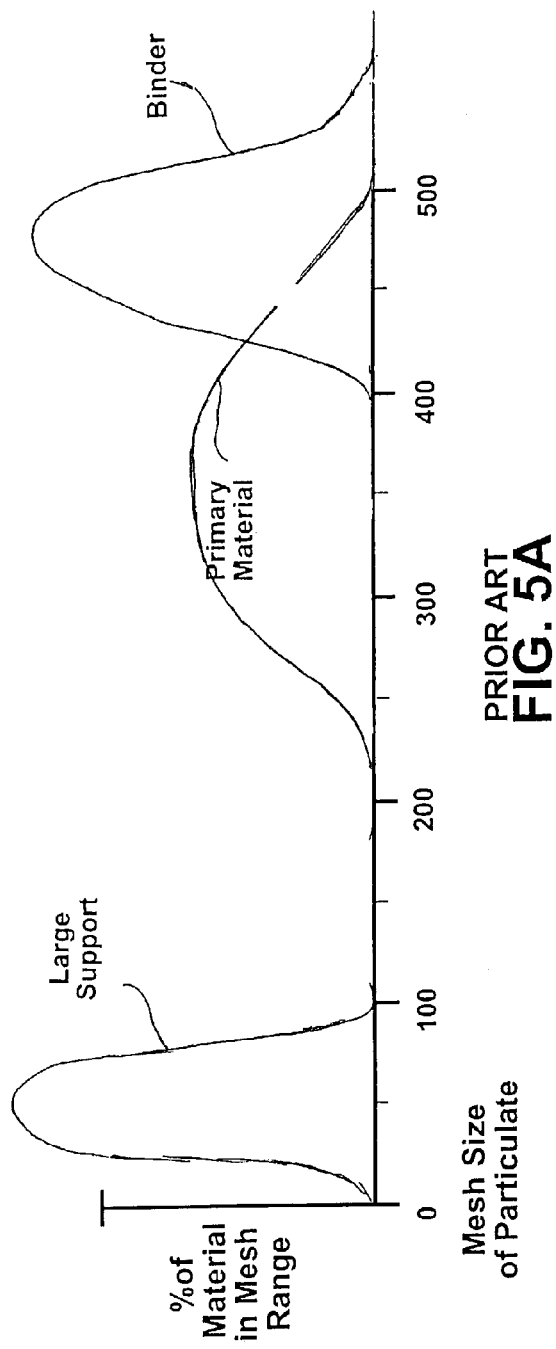
FIG. 5A schematically illustrates particle sizes for manufacture of granular media according to the prior art.
Figure 5B:
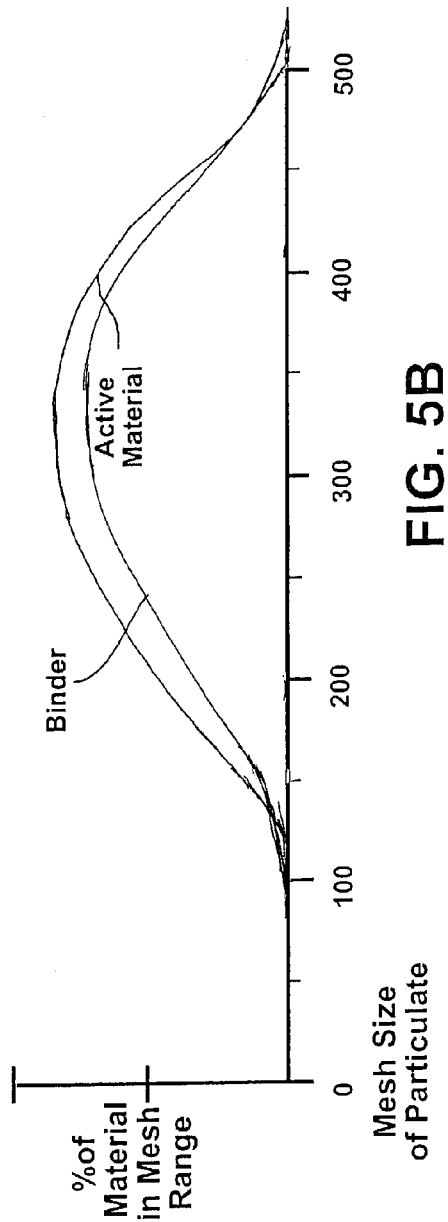
FIG. 5B schematically illustrates particle sizes for manufacture of one embodiment of the invention.

FIG. 5B illustrates schematically examples of size ranges of the invented two-component system, wherein the active particles are in the range of about 1-150 microns (100-500 mesh) and the binder particles are also in the range of about 1-150 microns. Preferably, there are no particles larger than the primary particles and binder particles, that is, there are no large support particles such as are typical in the three-component granules. As may be seen in FIG. 5B, there may be some small percentage of materials (the tails that are below about 5 wt %) outside of the preferred range of mesh, depending on the method of manufacture, sizing, screening, and handling.

The granules according to the invention provide high activity and high surface area due to the interior voids and channels that expose high surface area to the water or liquid being treated. Good pressure drop is achieved by sizing the granules to an appropriate range that does not restrict flow through a bed of the granules. The total diameter of a media granule according to many embodiments of the invention are in the 4 to 200 mesh range (75 micron up to about 4700 micron), and preferably in the 4-100 mesh range (140 micron up to about 4700 micron). This results from many 1-150 micron (or even larger) binder particles sticking together and becoming coated with the primary active material (1-150 micron or even larger). In especially-preferred manufacturing processes, sizing is preferred in order to separate any the >1700 micron granules into more than one 250-1700 micron granules.

To make the preferred embodiment, two powders are mixed together, one being a powdered binder and one being a powdered carbon or sorbent or other active material. Many embodiments of said mixtures, and hence of the resulting granules, consist of 8-50 wt-% binder and 92-50 wt-% active material, and no other components. More preferably, said mixtures, and hence resulting granules, consist of 8-35 wt-% binder and 92-65 wt-% active material, with no other components.

The mixture is heated to a temperature at which the binder softens enough to form the binder matrix, clump, or connectors, and the active material coats the binder matrix or clumps or sticks together due to the binder. This temperature is typically in the range of 275-350 degrees F. for many of the preferred binders, but may be even higher, for example, 275-425 degrees or even up to 500 degrees F. The target temperature is within about 25 degrees of the Vicat softening point, but this may be lowered or raised depending upon the particular granule characteristics desired. The quality and effectiveness of many embodiments of the invention are not extremely sensitive to what temperature is chosen. With many polyolefin binder particles, which are white before heating, one may observe when the particles reach an appropriate temperature due to the particles losing their white color and becoming clear.

While still warm, the material resulting from the heating and agitating step is sized, and the mixture is cooled to ambient by any of various methods, to obtain the invented media. Sizing the heated mixture while warm, rather than after cooling, serves to limit fines production. This is believed to be because the breaking apart of warm granules to the desired size granule comprises a separation or pulling apart of portions of the binder, rather than breaking of solidified binder or active particles, and does not produce significant fines. Sizing a cool mixture (or a cool compressed block of granules) is believed to break binder and/or active particles, and produces more fines of binder and/or active material.

For use, the invented media is loaded into a cartridge, filter, tank, housing or other vessel with appropriate support and screening and influent and effluent means directing fluid to the media and away from the media. The operation temperature should be significantly below the temperature at which the media was made, to prevent the binder softening enough to release the primary material and to prevent further deformation of the binder. The invented media is especially beneficial in gravity flow water filtration applications.

By using only the two components, without a third material, (that is, without a traditional non-tacky, non-binding support material), the manufacturer is able to obtain a high yield of high active-surface-area, appropriate-pressure-drop media. The preferred methods and compositions result in particles that exhibit appropriate packing characteristics in a filter/treatment bed or housing, and that exhibit excellent treatment performance. By using the invented methods of manufacture, a high yield of on-spec product is achieved.

The invented media is called a "two-component" media because it is manufactured from a binder material and an active material, rather than from a combination of a solid support, a binder material, and an active material. By using the term "two-component," the inventors do not intend to limit the binder to being only one type of polymer, for example, but do intend to include binders that may comprise one binder or a mixture of two or more binders that may be softened at temperatures in an appropriate range for causing active material to adhere to the binder(s) and for causing multiple particles of binder to adhere to each other. Also, the inventors do not intend "two-component" to limit the active material to being only one type of active material, but rather do intend to include one active material or a mixture of two or more active materials.

For example, the binder may itself be a mixture of several different binder particles, preferably, but not necessarily, exhibiting close to the same melting/softening point. For example, different polyolefins may be used, or two different binders wherein one is optimum for creating voids and channels in the granules and one that reduces fines.

Likewise, the active material may be a mixture of several different active particles for different purposes, preferably, but not necessarily, being close to the same diameter range. Two or more active materials selective to different metals or to different species within the fluid being treated, may be used. The different active materials may lie in a monolayer or multiple layers in the binders, or, in the "connector" style binder structures, the different active materials may be stuck together adjacent to each other in a random structure of active particles connected by discontinuous globules of binder.

By using a low melt index binder material, the binder is preferably prevented from encapsulating the active material or covering its active sites, and yet the binder's tackiness at the temperatures used in manufacture of the media cause the active material(s) to adhere to the outside surface of the binder and the binder surfaces in the interior voids and channels of the granule. The preferred shapes of the support structure of the invented granule range from a binder matrix, to a grouping of binder-coated cores, to relatively smaller, discontinuous amounts of binder in-between active particles. The "coating" the support structure preferably includes partial or total coating of the binder's outer surface, which translates to the outer surface of the granule being coated with active particles and to the granule having many interior voids and channels which are defined by binder surfaces inside the granule being coated with or attached to active particles. Preferably, as discussed above, the various binder structures work to agglomerate the active materials without any support material besides the binder, and especially without a third component consisting of a large solid particulate support at or near the center of the media granule.

Compared to prior art materials, the invented granules provide increased active surface area, because volume is not taken up by a solid support particle that is substantially greater in size than the active material. Some increased pressure drop may be witnessed in the invented media because of the particles of binder and active material being bound together, compared to the large solid support particles in the prior art. The combined binder and active material structure in the invented granules, however, has sufficient interior void space and channels to provide acceptable or good pressure drop even in gravity flow applications, in that the liquid flows into and through the void spaces both between granules and inside the granules. Further, the increased mass and exposed surface area of active material in the invented granules, compared to prior art three-part granules, results in increased activity per volume of the media.

Examples of especially-preferred granules which are binder-agglomerated active materials include: activated carbon agglomerated with polyolefin binder; hydrated metal oxide particles (with or without activated carbon active particles) agglomerated with polyolefin binder; arsenic reduction materials such as iron hydroxide agglomerated with various binders; fine metal powders agglomerated with polyethylene binder for chlorine removal.

EXAMPLE I

Mix 50×200 mesh activated carbon with powdered polyolefin binder ("Microthene FN510" powdered polyolefin binder with nominal 20 micron particle size), wherein the activated carbon is 85-92 wt-% and the polyolefin binder is 15-8 wt-% of the mixture.

Uniformly mix and agitate while heating the mixture to between 325-375 degrees F., over a period of about 2-10 minutes. Continually agitate or stir the mixture during this process.

Size the resulting granules while warm using screens to 20×50 mesh. Cool.

EXAMPLE II

Mix Alusil Powder of 40-70 micron size (available from Selecto Scientific) with "Microthene FN510" powdered polyolefin binder with nominal 20 micron particle size, wherein the Alusil Powder is 65-90 wt-% of the mixture and the binder is 35-10 wt-% of the mixture. Alternatively, the Alusil Power may be 80-90 wt-% of the mixture and the binder may be 20-10 wt-% of the mixture.

Uniformly mix and agitate while heating the mixture to between 325-375 degrees F., over a period of about 2-10 minutes. Continually agitate or stir the mixture during this process.

Size the resulting granules while warm using screens to 20×50 mesh. Cool.

Although this invention has been described above with reference to particular means, materials and embodiments, it is to be understood that the invention is not limited to these disclosed particulars, but extends instead to all equivalents within the scope of the following claims.

We claim:

1. A fluid treatment granular media comprising binder-agglomerated active material consisting essentially of a plurality of separate two-part granules, each of said two-part granules comprising:
    a central support core of binder material having an outer surface and internal surfaces defining void spaces in the granule; and
    an active material comprising activated carbon, said active material being active for fluid treatment adhering to said outer surface of the central support core of binder material without compression of said active material and said binder material and adhering to said internal surfaces without compression of said active material and said binder material;
    wherein the binder material is a polyolefin with a melt index of less than or equal to 1 g/10 min;
    wherein said two-part granules do not comprise said active material being bound to any solid support core of non-binder material; and
    wherein said two-part granules are each 75 microns up to about 4700 microns in diameter.

2. The media as in claim 1, wherein the active material comprises a sorbent material.

3. The media as in claim 1, wherein the binder material has a Vicat Softening Point in the range of 150-400 degrees F., and the active material has a softening point of greater than 400 degrees F.

4. The media as in claim 1 wherein the central support core of binder material is a matrix of binder particles stuck together and deformed to be substantially non-spherical.

5. The media as in claim 1 wherein the central support core of binder material is a grouping of binder particles stuck together and substantially retaining a spherical shape.

6. The media as in claim 4 wherein the binder material is made from binder particles having less than 150 micron diameter.

7. The media as in claim 5 wherein the binder material is made from binder particles having less than 150 micron diameter.

8. The media as in claim 6 wherein the active material is active particles of less than 150 micron diameter.

9. The media as in claim 7 wherein the active material is active particles of less than 150 micron diameter.

* * * * *